(12) United States Patent
Otero Diaz et al.

(10) Patent No.: US 10,809,091 B2
(45) Date of Patent: *Oct. 20, 2020

(54) STREET-LEVEL GUIDANCE VIA ROUTE PATH

(71) Applicant: Uber Technologies, Inc., San Francisco, CA (US)

(72) Inventors: Ana Lilia Otero Diaz, Woodinville, WA (US); Hae Jin Lee, Seattle, WA (US); Luis Eduardo Cabrera-Cordon, Bothell, WA (US); Doyop Kim, Fremont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 15/487,356

(22) Filed: Apr. 13, 2017

(65) Prior Publication Data

US 2017/0219372 A1 Aug. 3, 2017

Related U.S. Application Data

(63) Continuation of application No. 14/514,227, filed on Oct. 14, 2014, now Pat. No. 9,638,538.

(51) Int. Cl.
*G01C 21/36* (2006.01)
*G01C 21/34* (2006.01)

(52) U.S. Cl.
CPC ..... *G01C 21/3676* (2013.01); *G01C 21/3423* (2013.01); *G01C 21/3635* (2013.01);
(Continued)

(58) Field of Classification Search
CPC ............ G01C 21/3676; G01C 21/3423; G01C 21/3673; G01C 21/3635; G01C 21/3647; G01C 21/3667
(Continued)

(56) References Cited

U.S. PATENT DOCUMENTS 6,710,774 B1 3/2004 Kawasaki et al.
7,050,102 B1 5/2006 Vincent
(Continued)

FOREIGN PATENT DOCUMENTS

EP 1614997 A1 1/2006
EP 2015023 A1 1/2009
(Continued)

OTHER PUBLICATIONS

Australian First Examination Report, Australian Application No. 2015332046, dated Feb. 20, 2018, 3 pages.
(Continued)

*Primary Examiner* — Nadeem Odeh
(74) *Attorney, Agent, or Firm* — Fenwick & West LLP

(57) ABSTRACT

To more realistically represent the real-world, a street-level view depicts a route path and objects that occlude one or more segments of the route path. Such objects can include guardrails, buildings, or any of a variety of other objects as described herein. The street-level view can be implemented in advance to preview travel, during travel, or in other scenarios. The street-level view presents the route path from a viewpoint that can be a current location of a traveler or an arbitrary location.

16 Claims, 10 Drawing Sheets

(52) U.S. Cl.
CPC ..... *G01C 21/3647* (2013.01); *G01C 21/3667* (2013.01); *G01C 21/3673* (2013.01)

(58) Field of Classification Search
USPC .......................................................... 701/532
See application file for complete search history.

(56) References Cited

U.S. PATENT DOCUMENTS

| | | | |
|---|---|---|---|
| 7,840,032 | B2 | 11/2010 | Ofek |
| 8,237,791 | B2 | 8/2012 | Chen et al. |
| 8,319,772 | B2 | 11/2012 | Fong et al. |
| 8,640,020 | B2 | 1/2014 | Chen et al. |
| 2006/0271286 | A1 | 11/2006 | Rosenberg |
| 2007/0070069 | A1 | 3/2007 | Samarasekera et al. |
| 2011/0106428 | A1 | 5/2011 | Park et al. |
| 2011/0109618 | A1* | 5/2011 | Nowak ............ G01C 21/3647 345/419 |
| 2011/0264362 | A1 | 10/2011 | Van Raamsdonk et al. |
| 2011/0313653 | A1* | 12/2011 | Lindner ............ G01C 21/3632 701/523 |
| 2012/0185165 | A1 | 7/2012 | Geelen et al. |
| 2012/0221241 | A1 | 8/2012 | Nurmi |
| 2012/0323490 | A1 | 12/2012 | Kim et al. |
| 2013/0162665 | A1 | 6/2013 | Lynch |
| 2013/0345981 | A1* | 12/2013 | van Os ............ G01C 21/3626 701/540 |
| 2014/0365113 | A1* | 12/2014 | McGavran ............ G01C 21/00 701/425 |
| 2015/0094955 | A1* | 4/2015 | Lee ............ H04W 4/021 701/532 |

FOREIGN PATENT DOCUMENTS

| | | |
|---|---|---|
| EP | 2159541 A1 | 3/2010 |
| EP | 2672459 A1 | 12/2013 |

OTHER PUBLICATIONS

Canadian Office Action, Canadian Application No. 2,964,693, dated Jan. 2, 2018, 4 pages.
PCT International Search Report and Written Opinion, PCT Application No. PCT/IB2015/057891, dated Dec. 18, 2015, 16 pages.
Kopf et al., "Street Slide: Browsing Street Level Imagery," *ACM Transactions on Graphics,* vol. 29, Issue 4, Jul. 2010, 10 pages.
"What is Junction View," Garmin Support, Jan. 10, 2014, 1 page.
"Streetside," Explore Streetside, Microsoft.com, visited Oct. 8, 2014, 2 pages.
United States Office Action, U.S. Appl. No. 14/514,227, dated Jun. 17, 2016, 35 pages.
United States Office Action, U.S. Appl. No. 14/514,227, dated Feb. 11, 2016, 20 pages.

* cited by examiner

STREET-LEVEL GUIDANCE VIA ROUTE PATH

CROSS-REFERENCE TO RELATED APPLICATION(S)

This application is a continuation of and claims priority of U.S. application Ser. No. 14/514,227, filed Oct. 14, 2014, which is incorporated by reference in its entirety.

BACKGROUND

Mobile phones now have functionality and applications that provide useful digital maps. In addition, given a starting point, a route can be generated by which a user can navigate to a destination. Such routes are typically constructed for vehicle drivers and include such instructions as, "Turn left on Main Street." The driver can then proceed to the desired destination without any prior knowledge of the location.

Still, because travelers can face hurdles when attempting to take advantage of digital maps, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be a method implemented at least in part by a computing device, the method comprising, in a street-level view of a depicted scene, superimposing a route path over the street-level view; and depicting the route path as occluded by a physical object in the street-level view.

An embodiment can be implemented as a system comprising, in one or more computer-readable media, a stored representation of a digital map comprising information about street-level views, wherein the information comprises photographic scene bubbles associated with the street-level views and geometry associated with the street side views; a street-level view generator configured to receive a geometry and a photographic bubble associated with a street side view; wherein the street-level view generator is further configured to receive a viewpoint and output a street-level depiction of a route path as it appears from the viewpoint, wherein at least a portion of the route path is depicted as occluded by an occluding object indicated as being in front of the portion of the route path in the geometry.

An embodiment can be implemented as one or more computer-readable media comprising computer-executable instructions that, when executed by a computing system, perform a method comprising detecting that a mobile device is approaching a turn onto a street at an intersection that is part of a route path between a starting point and a destination; responsive to detecting that the device is approaching the turn, displaying a photograph-based street-level view of the intersection; wherein displaying the photograph-based street-level view of the intersection comprises: displaying a superimposed name of the street on the photograph-based street-level view; displaying the route path as superimposed on the photograph-based street-level view; and depicting a portion of the superimposed route path as occluded by an object in the photograph-based street-level view.

As described herein, a variety of other features and advantages can be incorporated into the technologies as desired.

DETAILED DESCRIPTION

Example 1—Example Overview

The technologies described herein can be used for a variety of street-level guidance scenarios, and adoption of the technologies can provide improved techniques for communicating routes to travelers.

In any of the examples herein, street-level imagery can be used as a canvas for providing guided navigation. Paths and instructions can be drawn on top of it in a three-dimensional way that considers geometry and perspective.

Street-level imagery can closely mimic how the world looks when driving, providing a great reference for guided navigation. Incorporating routing on top of the street-level imagery, such as showing the path and turns that need to be followed for a route can provide a closer-to-reality experience and can provide context that travelers can use to become oriented to their surroundings.

Street-level imagery can be used in conjunction with conventional technologies or as the main map for guided navigation. Paths and instructions can be drawn on top of the street-level imagery. Street-level imagery can be used in any scenario as a reference for destinations, entrances, and the like.

A route can be displayed as part of instructions (e.g., guidance) to a traveler on a user interface to better facilitate travel by the traveler on a determined route. Street-level guidance can be implemented in advance to preview travel, on-demand during travel, or in other scenarios. Other features described herein can be implemented to improve street-level guidance. An overall superior user experience and helpful guidance to the user can result.

Various other features can be implemented and combined as described herein.

Example 2—Example System Implementing Street-Level Guidance

Figure 1:
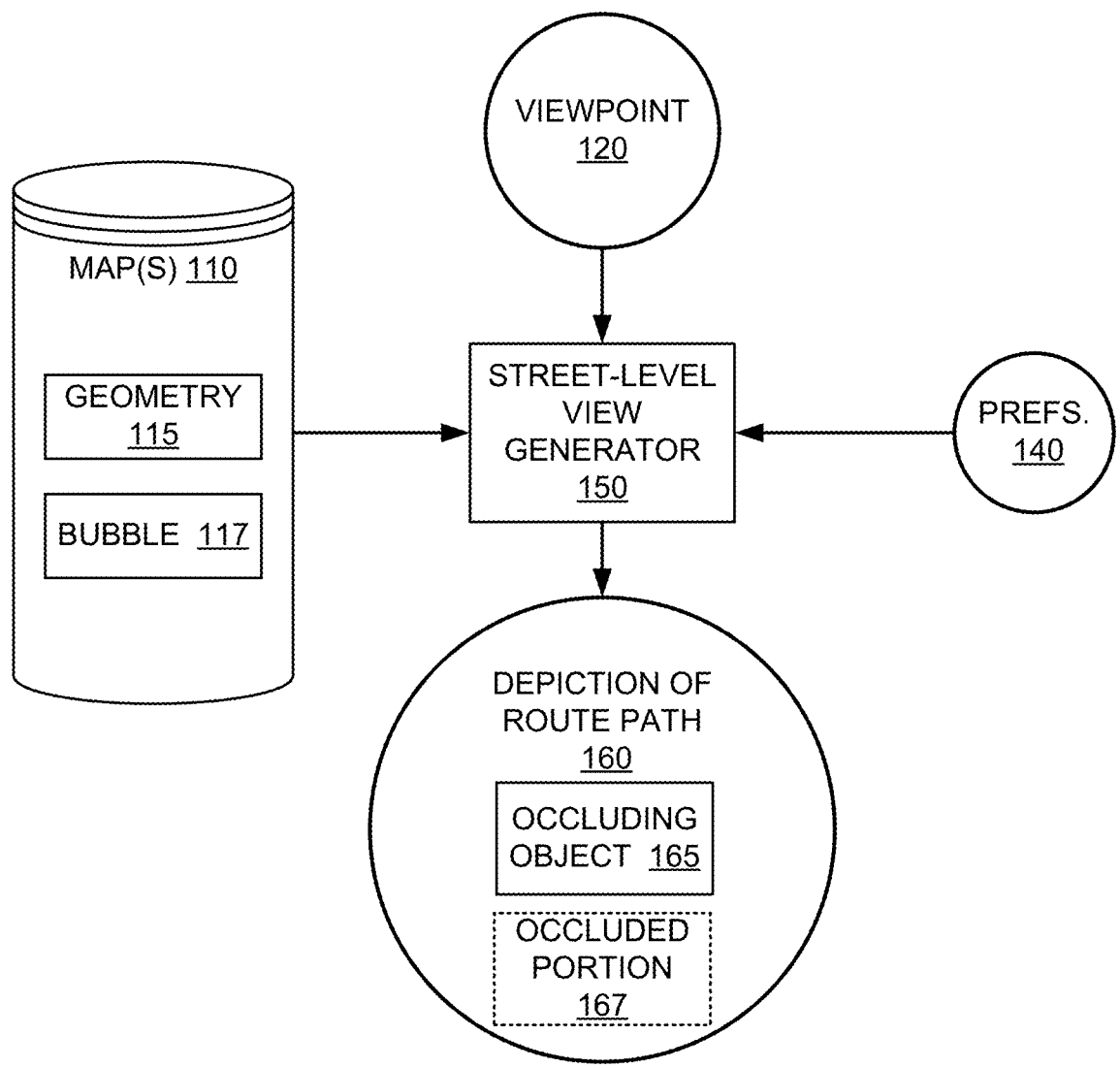
FIG. 1 is a block diagram of an example system implementing a digital map with street-level guidance via a route path.
Figure 1:

FIG. 1 is a block diagram of an example system 100 implementing a digital map with street-level guidance via a route path.

In the example, a street-level view generator 150 is configured to receive information from a stored digital map 110. The digital map 110 can take the form of a stored representation of geography in one or more computer-readable media that comprise information about various locations represented by the map(s). As shown the street-level view generator 150 can be configured to received various information from the digital map 110 (e.g., geometry 115 and a scene bubble 117) and/or a stored representation of the digital map 110 and a viewpoint 120 as input. In some cases, the preferences 140 can also be accepted as input.

The street-level view generator 150 is configured to generate a depiction of a route path 160 (e.g., as part of a depicted scene) that comprises an occluding object 165 and an occluded portion 167 of the route path (e.g., which may not be visible as described herein). Such a depiction can be generated based on the geometry 115 and the scene bubble 117 as described herein. The generator 150 can be further configured to receive a viewpoint 120 as shown, and the generator 150 can output a depiction of the route path as it appears from the viewpoint, where at least a portion of the route path is depicted as occluded by an occluding object 165 indicated as being in front of the portion of the route path (e.g., the portion of the underlying street of the route path) in the geometry.

The viewpoint 120 can be implied or take a default value (e.g., to a current location as determined by location technology of a mobile device of a traveler) or it can be set to any arbitrary location (e.g., location(s) of maneuver(s) throughout a journey to preview a journey).

Although other modes are possible, the viewpoint can include or otherwise be derived from a current location of a device on which the street-level view is displayed.

In practice, the route path 160 and the occluding object 165 can be depicted as part of a street-level view (e.g., of a scene). Such a street-level view can depict streets, buildings, and other features of the scene to indicate a direction of travel (e.g., that includes a turn or other course indication or indication of a maneuver).

Although various components are shown in separate boxes, in practice, component boundaries may vary. For example, the components can be provided as part of a mobile device operating system, map application, mapping appliance, or the like. Other arrangements are possible while still implementing the technologies. For example, the viewpoint 120 can be communicated to the map 110 instead of or in addition to the generator 150, and the like.

Further, client-server operation can be supported whereby a requesting application on a client mobile device provides input information to a server (e.g., in the cloud) and receives the route path 160 in response. In such a case, the maps 110 may reside outside of the requesting device due to their size. However, implementations where the maps 110 or desired portions or regions thereof are downloaded or preloaded from a server (e.g., cloud) to a local device for consultation can also be supported. The street-level generator 150 can be client- or server-side. Functionality can be divided between client and server (e.g., cloud) in any number of ways while preserving the technologies.

Although mobile device implementations are described, fixed location implementations can be supported (e.g., a requesting browser on a desktop computer accesses a server via the Internet).

In practice, the systems shown herein, such as system 100, can be more complicated, with additional functionality, more inputs, outputs, and the like. In practice, additional functionality related to location (e.g., GPS, indoor positioning technology, or the like) can be included to determine a current location of a device employed by a traveler to obtain directions. Additionally, a specialized mapping device primarily or fully dedicated to providing map functionality, including the route generation described herein, can implement the described technologies.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, preferences, generators, maps and applications can be stored in one or more computer-readable storage media or computer-readable storage devices. The technologies described herein can be generic to the specifics of operating systems or hardware and can be applied in any variety of environments to take advantage of the described features.

Example 3—Example Method Implementing Street-Level Guidance

Figure 2:
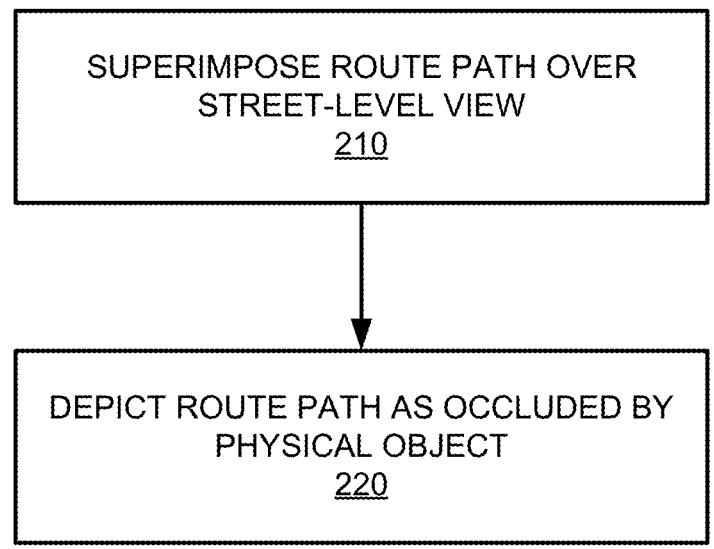
FIG. 2 is a flowchart of an example method of implementing a digital map with street-level guidance via a route path.

FIG. 2 is a flowchart of an example method 200 of implementing a digital map with street-level guidance via a route path and can be implemented, for example, in the system shown in FIG. 1.

The method 200 is typically performed as part of a request by a traveling user for directions from a mobile device. However, as described herein, fixed location implementations can also be supported. In practice, a list of instructions serving as directions for navigating to a destination location can be displayed for the traveler to follow.

At 210, a route path is superimposed over a street-level view. For example, a shaded or colored path can be shown that traces the route path. In a mobile device scenario, the current location the mobile device can be tracked to determine which route path to display as a trip progresses. Superimposing can be performed by placing the route path overtop of the scene or vice versa.

At 220, the route path (e.g., a portion of the route path) is depicted as occluded by a physical object. For example, it can be determined that the physical object is situated between the viewpoint and the route path (or street associated with the route path). Responsive to determining that the physical object is situation between the viewpoint and the route path (or street associated with the route path), occlusion can be applied to the route path as described herein.

The method 200 can be incorporated into a larger process (e.g., obtaining a viewpoint, generating a view from a scene bubble, incorporating other items into the street-level view, and the like). Such a process can be part of scenario for finding directions (e.g., from a current location, a specified location, an implied location, or the like).

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Example Viewpoint

In any of the examples herein, a viewpoint can be information sufficient to determine the location and orientation of a traveler for purposes of presenting the street-level view. For example, a particular location (e.g., logical or geographical) in combination with an orientation (e.g., facing in a compass direction or toward a street or landmark) can be used to determine the scene to be presented.

A viewpoint can be expressed in terms of or relative to an original viewpoint (e.g., used to capture or generate the scene). For example, as the traveler continues traveling, the viewpoint can move in terms of how close or far away the current viewpoint is from the original viewpoint.

Example 5—Example Scene Bubble

In any of the examples herein, a scene bubble can take the form of a photographic scene bubble (e.g., generated by a camera situated at the location of the scene and capturing photograph(s) of the scene), rendered version of the scene (e.g., based on a geometry or other information representing the scene), or the like. The street-level view can be based on such scene bubbles of the depicted scene.

Geometry can be associated with the scene bubble and used to implement occlusion as described herein. The scene bubble can be chosen, adjusted, or both based on the viewpoint (e.g., location and orientation) for the scene being depicted.

For example, the scene bubble can be stored as a panoramic (e.g., 360 degree) view. An appropriate portion of the panoramic view can be chosen based on the viewpoint.

Example 6—Example Street-Level View

In any of the examples herein, a street-level view can take the form of a visual presentation that depicts a real-world scene from the perspective of a traveler at (e.g., the street level of) an actual geographical location (e.g., a driver who is proceeding toward a street intersection). A street-level view can be a digital image generated by a computing system based on a photographic or other scene bubble as described herein. Street-level views are differentiated from digital maps that present a bird's eye or other view from above. Such maps can be incorporated into the technologies described herein, but street-level views can be particularly helpful to travelers because they can greatly assist in guiding the traveler along a route path. Features such as perspective and three-dimensionality can simulate a familiar paradigm (e.g., being at the scene and seeing it firsthand) for the traveler. The street-level view can thus serve as a snapshot of a scene (e.g., an upcoming maneuver at an intersection or the like).

Figure 3:
FIG. 3 is a screen shot showing street-level guidance via a route path.

FIG. 3 is an example screen shot 300 showing street-level guidance via a route path that can be used in any of the examples herein. In the example, a traveler 310 is traveling or previewing travel that involves a right turn onto a street (e.g., "Boren").

The current route path 310 continues forward and then turns right. The immediately upcoming portion 320 is wider due to perspective, and the route path 310 narrows as it proceeds further away from the traveler's viewpoint. The portion of the route path 310 behind the guard fence 330 is occluded. In the example, the occluded portion is completely invisible, but other implementations are possible as described herein.

Example 7—Example Route Path

In any of the examples herein, a route path can be a path placed on (e.g., superimposed on) a street-level view to show a path. Such a path can be the path on which the traveler is to proceed. In practice, the path can appear as a set of line segments, which can be straight, curved, or otherwise drawn. Turns, curves, or other maneuvers can be portrayed via the route path to indicate a direction in which the travel is to proceed. In practice, the route path can be a street path that follows a street. But, the technologies can also be applied to other modes of transportation (e.g., walking, cycling, or the like). If the route path comprises a turn, depicting the route path as occluded can comprise occluding a portion of the route path beyond the turn.

For purposes of geometry, the route path can be considered to be at the level (e.g., elevation) of the associated street (e.g., ground level) or above it (e.g., slightly above the elevation of the associated street).

In any of the examples herein, the route path can be shown as a translucent path or semi-transparent path (e.g., of an appropriate width) that preserves some detail underneath the route path (e.g., markings on the street or the like). The path can be depicted as one or more arrows (e.g., to show where a turn is to be made).

The technologies can be applied to scenarios involving a plurality of route paths. For example, multiple route paths can be shown to indicate alternative routes. Traffic conditions can be depicted by respective properties of the different route paths. For example, streets with poor (e.g., busy) traffic conditions can be portrayed in red, and streets with favorable (e.g., light) traffic conditions can be portrayed in green.

A plurality of route paths with a plurality of depicted properties can be occluded. Occlusion can at least partially preserve such depicted properties. For example, a red street can still be shown as red (e.g., but a fainter red, dotted red, or the like) when occluded.

Example 8—Example Street Names

In any of the examples herein, a street-level view can comprise a superimposed street name, such as the street name 340 (e.g., "Boren"). When placing the street name, a portion of the route path that is not occluded can be found and the street name can be superimposed on a portion of the street-level view. Therefore, an un-occluded portion of the route path can be identified, and the street name can be depicted on the route path in the un-occluded portion of the route path. A portion of the street name can fall off the route path (e.g., if the route path is too small). When choosing where to place the street name, a portion of the street that is not part of the route path but not occluded can be favored over a portion of the street that is occluded. Similarly, placing the street name on a portion of the route path that is depicted as occluded can be avoided (e.g., the street name can be repositioned or moved, even if it results in a portion of the street name falling outside the route path).

The street name can be for a street onto which the route turns. For example, such an arrangement can help the traveler find a street that is correspondingly named in directions ("e.g., Turn right onto Boren.")

Such a portion can be on a portion that is visually contiguous with the route path appearing immediately in front of the viewpoint or at a position on the route path beyond a break (e.g., an occluded portion) in the route path.

Example 9—Example User Guidance

In any of the examples herein, the technologies can be implemented as part of a guided navigation scenario. Such scenarios can help users traveling to a destination by providing instructions and visuals of the route and the steps the user needs to take. The visuals can take the form of a simplified representation of a map, and can be supplemented with the street-level view technologies described herein for intersections, exits, or other places where guidance can be helpful.

Modes of operation include both real time guidance (e.g., presenting the described street-level view responsive to determining that a current location of a device of the traveler is approaching the scene) or pre-planning guidance (e.g., presenting the described street-level view as part of an overall description of a trip) as described herein. Pre-planning guidance can be displayed on a device, printed for consultation, or both.

Example 10—Example Occlusion

In any of the examples herein, a route path (e.g., a superimposed route path) can be depicted as occluded by an object. Although complete occlusion can be accomplished by completely blocking view of the route path (e.g., removing a portion of the route path from view), partial occlusion can be accomplished in a variety of ways. For example, a portion of the path can be depicted specially (e.g., via a dotted or dashed line effect, thinner routes, or the like), thickness-based occlusion can be applied as described herein, and/or opacity of the object can be varied (e.g., to be less than 100% opaque) to depict the object as partially opaque in front of a portion of the route path. In practice, an occlusion can result in a route path (e.g., segment) being divided visually into two parts (e.g., on either side of the occlusion). However, in some cases, the occlusion can simply remove an end of the route path (e.g., there is no non-occluded portion beyond the occluded portion). A route path or other virtual object can be occluded by multiple objects.

A degree of occlusion can be controlled by a user preference or other mechanism.

Even when occluded, properties of the route path can be preserved (e.g., maintaining a color, width or the like).

Without occlusion, a route path does not appear to be part of the three-dimensional scene. For example, it would simply be drawn on top of a building (e.g., without regard for the fact that the building appears in front of the street in the real world).

A cap can be applied at the point where the route path is occluded (e.g., where the line segment ends). For example, an arrow end of the line segment can be applied.

Although many implementations are possible, occlusion can be accomplished by manipulating layers of an image of a scene. For example, if a route path is achieved via an image layer, occlusion can be applied to the route path layer of the image. Alternatively or in addition, when drawing the route path, those parts that are to be occluded can be drawn as occluding during the drawing process.

Example 11—Example Physical Objects

In any of the examples herein, a physical object can comprise physical objects such as a building, guardrail, fence, tree, movable objects (e.g., vehicle, pedestrian, or the like), terrain (e.g., hill or the like), substantial physical structure or object, or the like. Such a physical object can be depicted visually in the street-level scene and can be a visual representation of a real-world object situated at the geographical location of the street-level view (e.g., whether permanent or temporary).

Occlusion can be adjusted so that moveable objects do not result in depicted occlusion. For example, a route path is depicted as not occluded even though a vehicle is between the viewpoint and a corresponding portion of the street, but the portion of the route path that is occluded by a more permanent object (e.g., fence, guardrail, building, or the like) is depicted as occluded.

Example 12—Example Geometry

In any of the examples herein, the geometry of the real world scene being depicted can be used to generate a street-level view to determine which piece(s) of a route path to occlude or not occlude. So, based on a geometry (e.g., stored in one or more computer-readable media), it can be determined that an object is situated between a viewpoint of the street-level view and the street on which the route path is drawn. Geometry can be computed from a variety of sources, such as lidar scans, sonar, camera projections (e.g., via a plurality of photographs), infra-red reflection mechanisms, or the like for a geographical location associated with a depicted scene. Geometry associated with a scene bubble or scene can incorporate any one or more of such technologies.

The geometry can be of sufficient resolution that an accurate determination can be made regarding whether a virtual object (e.g., a route path or other visual device) depicted in the street-level view is occluded by an object in the geometry (e.g., the physical objects described herein).

Example 13—Example Graphical Point of Interest

A visual device (e.g., other than a route path) can be depicted in any of the examples herein to indicate a noteworthy location in a street-level view (e.g., a location where a route path turns). Such a visual device can take the form of a virtual sign, floating circle, graphical lollipop, or the like.

A virtual sign can take the form of a stem or post with a rectangle atop the stem. Information (e.g., about the point of interest) can be placed on the rectangle.

A graphical lollipop typically comprises a stem (e.g., tail) that extends from street level up to a particular height, upon which a graphical crown is placed. Information can be placed in the crown for view, and the lollipop can be depicted in a distinctive (e.g., neon, bright, or the like) color. An example graphical lollipop 350 is shown in FIG. 3.

A portion of the visual device can be depicted as occluded as shown based on the scene geometry as described herein (e.g., for an object that is situated between the viewpoint and the portion of the visual device). In this way, two different types of graphical devices (e.g., lollipop, route path, or the like) can be depicted as occluded in the same depicted scene.

Example 14—Example Street-Level View of Destinations

In any of the examples herein, a street-level view of a destination and surroundings can be provided to travelers so they know what to look for to find their destination based on their arrival street. For example, for a driving user, the parking entrance can be shown instead of the front of the building, which may be shown for a walking user. Any of a variety of graphical devices can be added to the street-level view to assist in finding a destination.

Figure 4:
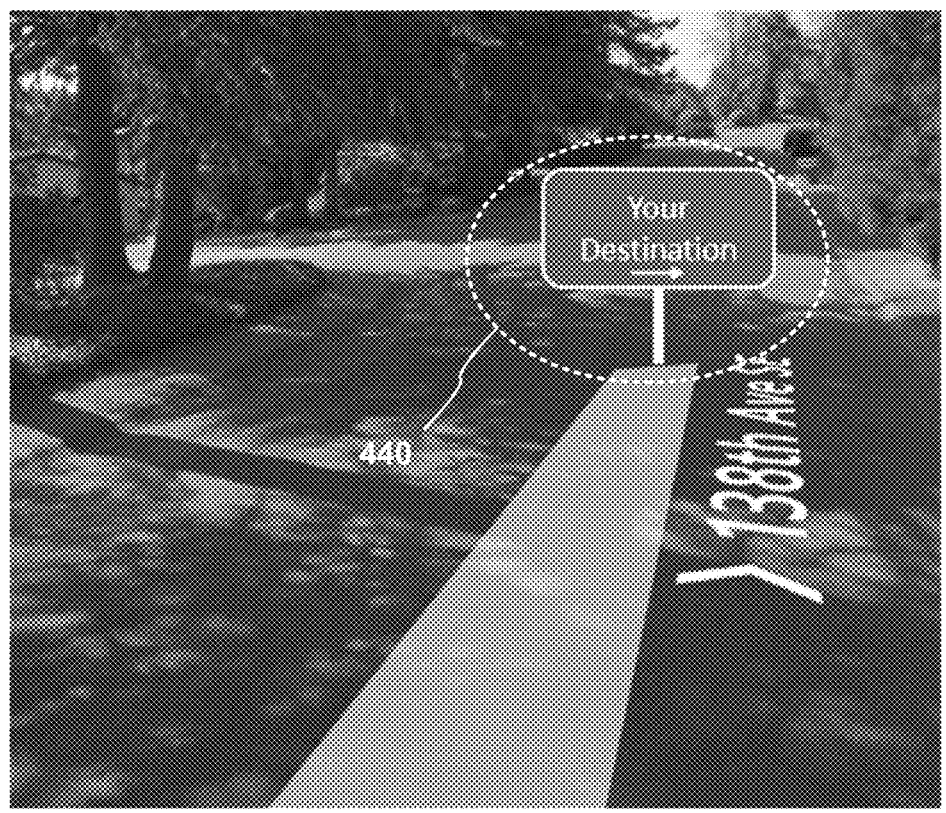
FIG. 4 is a screen shot showing an example of street-level destination guidance.

Such a graphical device can be used to indicate on what side of the street the destination lies. Thus, a visual indication in a realistic setting can be easily grasped by the traveler at a time of potential misdirection (e.g., when making a final maneuver to the destination). FIG. 4 is a screen shot 400 showing an example of street-level destination guidance via a virtual sign 440. The virtual sign 400 can be placed at the end of the route path and assists the user as to what side of the street a destination lies. Such a street-level view can be shown as the traveler approaches the destination, as a preview when showing a route, or both.

Occlusion as described herein can be applied to the graphical device if desired.

Example 15—Example Routes

In any of the examples herein, a route comprising an ordered list of instructions can specify how to navigate from a starting location to a destination location. The route can be communicated to a traveler by displaying, electronically speaking, or otherwise imparting a list of instructions to the traveler.

A wide variety of other functionality can be supported, such as determining whether a traveler is off-route, listing the remaining travel time, and the like.

Example 16—Example Transportation Modes

In any of the examples herein, supported transportation modes can take any of a wide variety of forms used by travelers for transportation. For example, transportation modes such as bicycling, driving, walking, bus, subway, tram, streetcar, train, ferry, taxi, or the like can be supported. Transit forms of transportation modes can include public transit, public transportation, as well as privately managed transit and the like.

Example 17—Example User Interface with Multiple Street-Level Views

Figure 5:
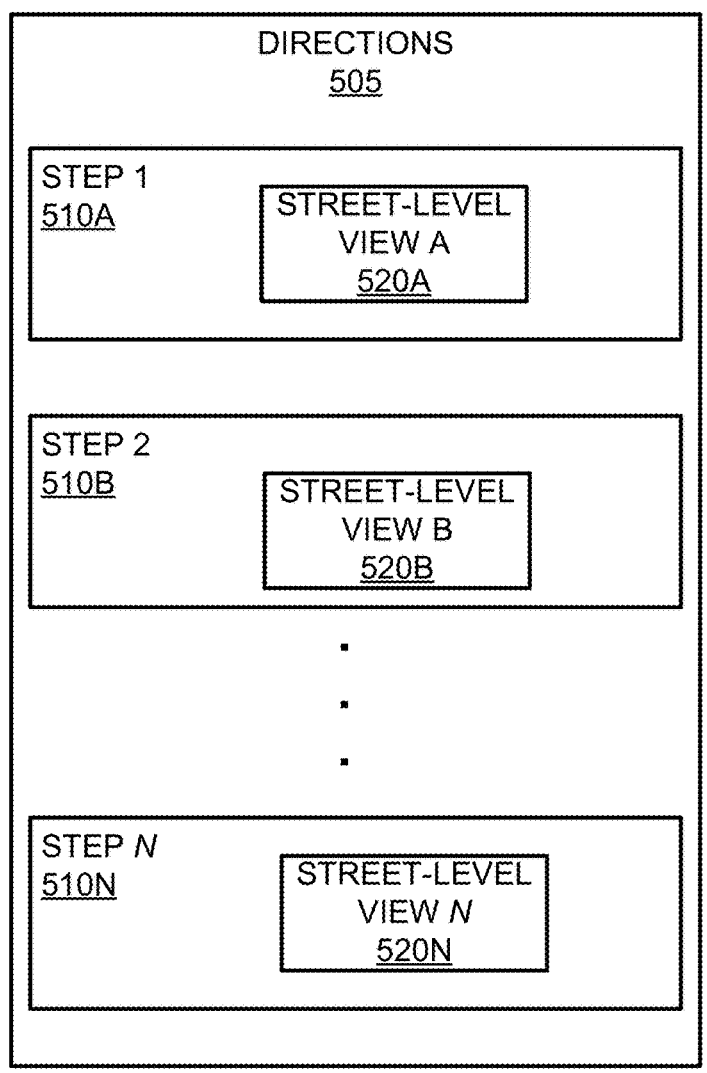
FIG. 5 is a wireframe of an example user interface showing multiple street-level views incorporating the street-level guidance technologies described herein.
Figure 5:

FIG. 5 is a wireframe of an example user interface 500 showing multiple street-level views 520A-N incorporating the street-level guidance technologies described herein. In the example, step-by-step (e.g., turn-by-turn) directions 505 are displayed as comprising a plurality of steps 510A-N in a sequential list. A plurality of the steps 510A-N can have respective street-level views 520A-N. Any one or more of the street-level views 520A-N can be constructed according to the technologies described herein.

Thus, a route path can be portrayed as part of step-by-step route directions. The step-by-step route directions can include a sequential list as shown, wherein the sequential list includes one other street-level view including a route path depicted as occluded by an object.

In practice, a user who is planning a trip can enter or otherwise select a destination, and the map software will generate the directions 505. Street-level views 520A-N can be particularly helpful because the actual view seen at the location can be depicted. Accordingly, a recognizable landmark (e.g., restaurant, pink building, or the like) can be seen in the street-level view and serve as a valuable cue to the traveling user.

Example 18—Example Step-by-Step Directions with Route Paths

Figure 6:
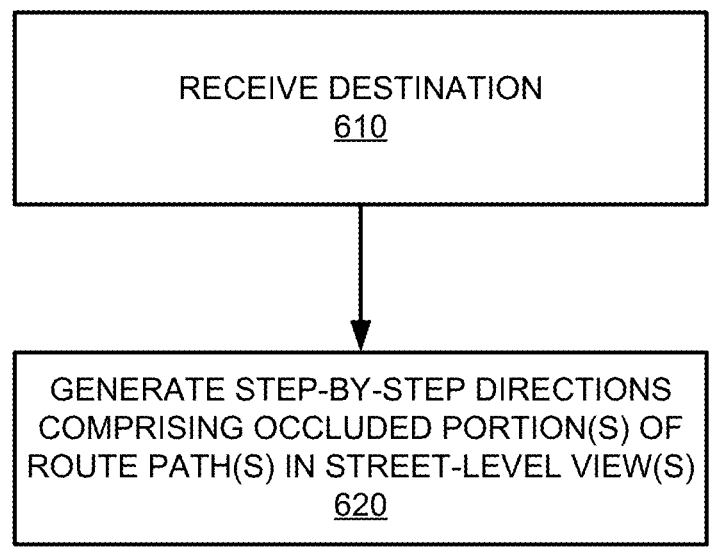
FIG. 6 is a flowchart of an example method of generating step-by-step directions with route paths constructed according to the technologies described herein.

FIG. 6 is a flowchart of an example method 600 of generating step-by-step directions with route paths constructed according to the technologies described herein.

At 610 a destination is received. A starting point can be explicitly received or implied (e.g., the current location, a home location, a work location, or the like).

At 620, step-by-step directions are generated. Such directions can comprise occluded portion(s) or route path(s) in street-level view(s) as described herein.

Example 19—Example Thickness-Based Occlusion

In any of the examples herein, occlusion can be based on thickness or mass of an occluding object. Thus, the occlusion (e.g., opacity) of the route path (e.g., line segment) can vary as it passes over an object that has varying thickness (e.g., depth from the perspective of the viewpoint).

Figure 7:
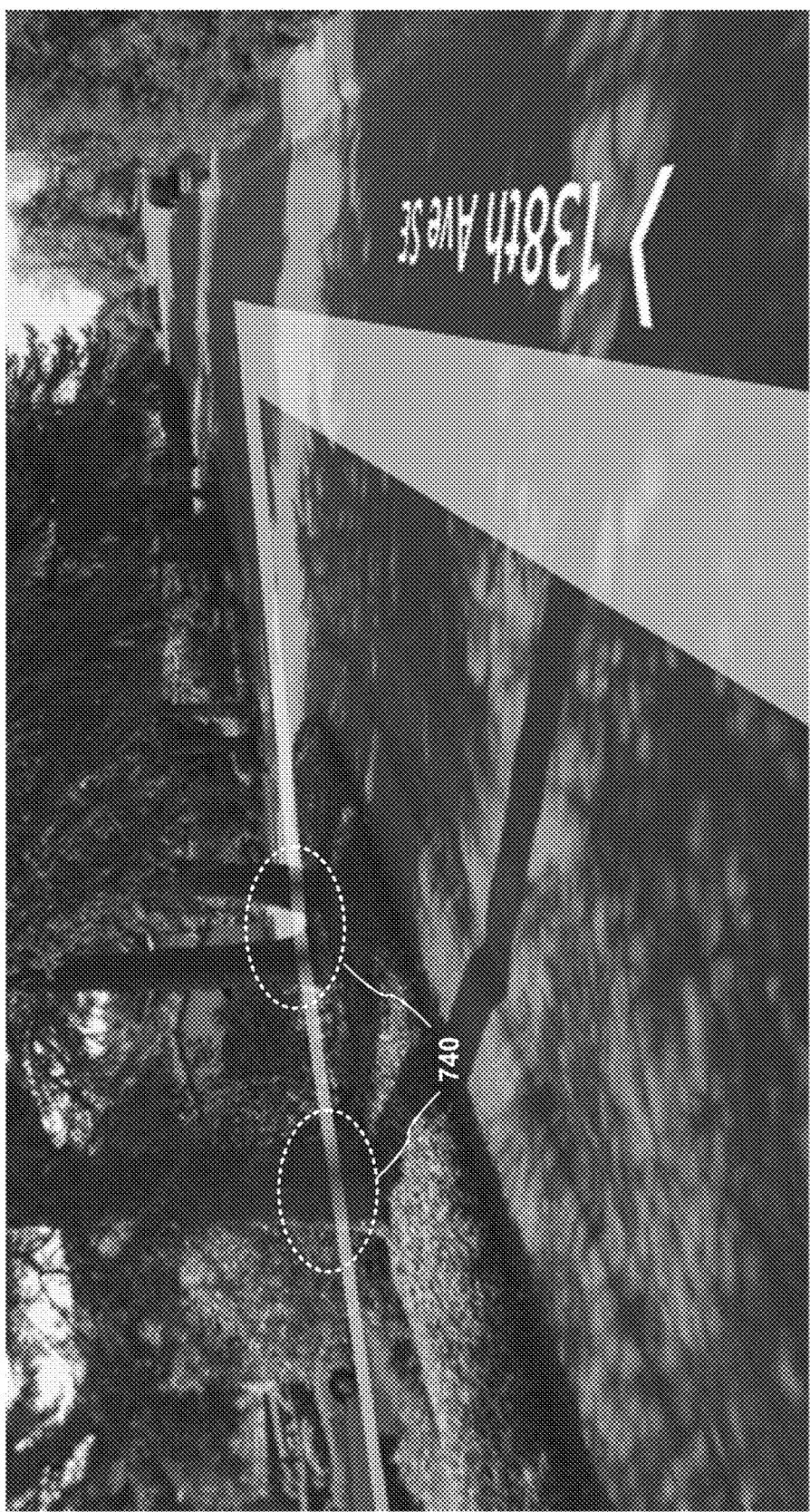
FIG. 7 is a screen shot showing an example of thickness-based occlusion.

FIG. 7 is a screen shot 700 showing an example of thickness-based occlusion. In the example, the route path is occluded based on thickness at three locations 740. Such occlusion can be achieved in a variety of ways. The thickness of an object occluding the route path can be measured, and occlusion can be varied accordingly (e.g., more thickness results in a higher degree of occlusion, e.g., more opaque).

The total mass of objects occluding the route path can be measured, and the occlusion varied accordingly (e.g., more mass results in a higher degree occlusion, e.g., more opaque).

In the example, the thickest part (e.g., middle) of the tree causes the most occlusion, and it varies until the route path is not occluded. A threshold can be set under which no occlusion occurs. Smoothing can be used to avoid anomalies.

Thickness, mass, or both can be determined via a geometry associated with the scene. For example, the thickness of a tree can be explicitly determined or interpolated (e.g., based on width).

Example 20—Example Implementation

In any of the examples herein, the street-level view of the depicted scene can be of an intersection (e.g., that is part of a route path between a starting point and a destination). It can be determined that a device is approaching a turn onto a street at the intersection. Responsive to such a determination, a photograph-based street-level view of the intersection can be displayed.

Displaying can include displaying a superimposed name of the street (e.g., onto which the turn of the route path turns) on the street-level view. The route path can be superimposed on the street-level view (e.g., as following the street). A portion of the route path can be depicted as occluded by an object in the street-level view as described herein.

Example 21—Example Advantages

As described herein, users can easily take advantage of generated street-level views to better understand route paths without having to actually travel to the location in advance. Because a traveler need not actually travel to the location, resources and time can be saved. Also, errors in navigation are avoided and unnecessary computing and network resources are reduced (e.g., for a traveler who goes in the wrong direction and then needs additional instructions to get back on route).

Example 22—Example Computing Systems

Figure 8:
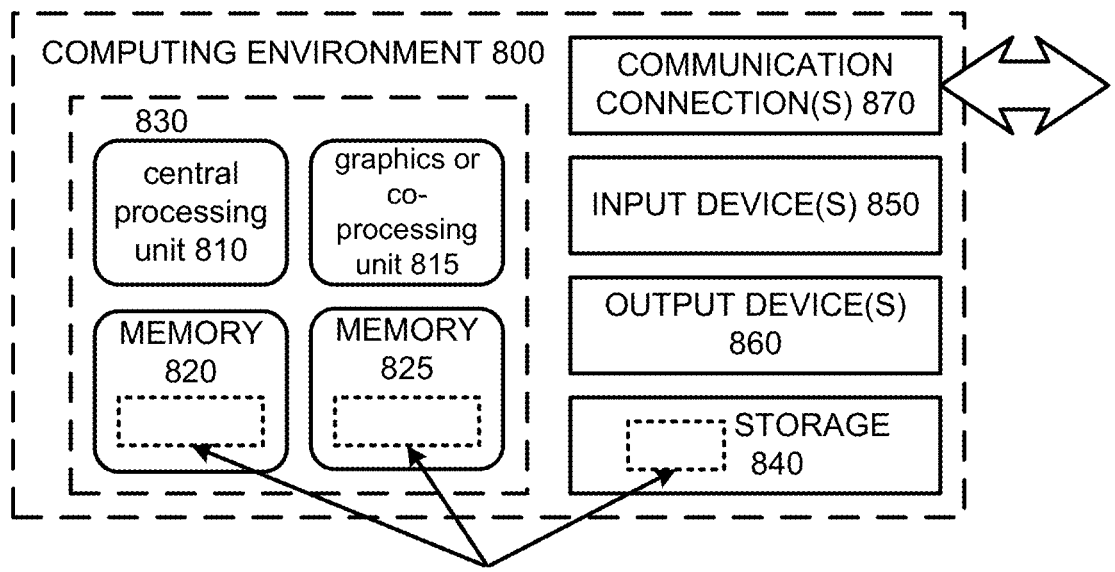
FIG. 8 is a diagram of an example computing system in which described embodiments can be implemented.

FIG. 8 illustrates a generalized example of a suitable computing system or environment 800 in which several of the described innovations may be implemented. The computing system 800 is not intended to suggest any limitation as to scope of use or functionality, as the innovations may be implemented in diverse general-purpose or special-purpose computing systems. A communication device as described herein can take the form of the described computing system 800.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, solid state drives, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 800, computer-readable media include memory 820, 825, storage 840, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 23—Example Mobile Device

Figure 9:
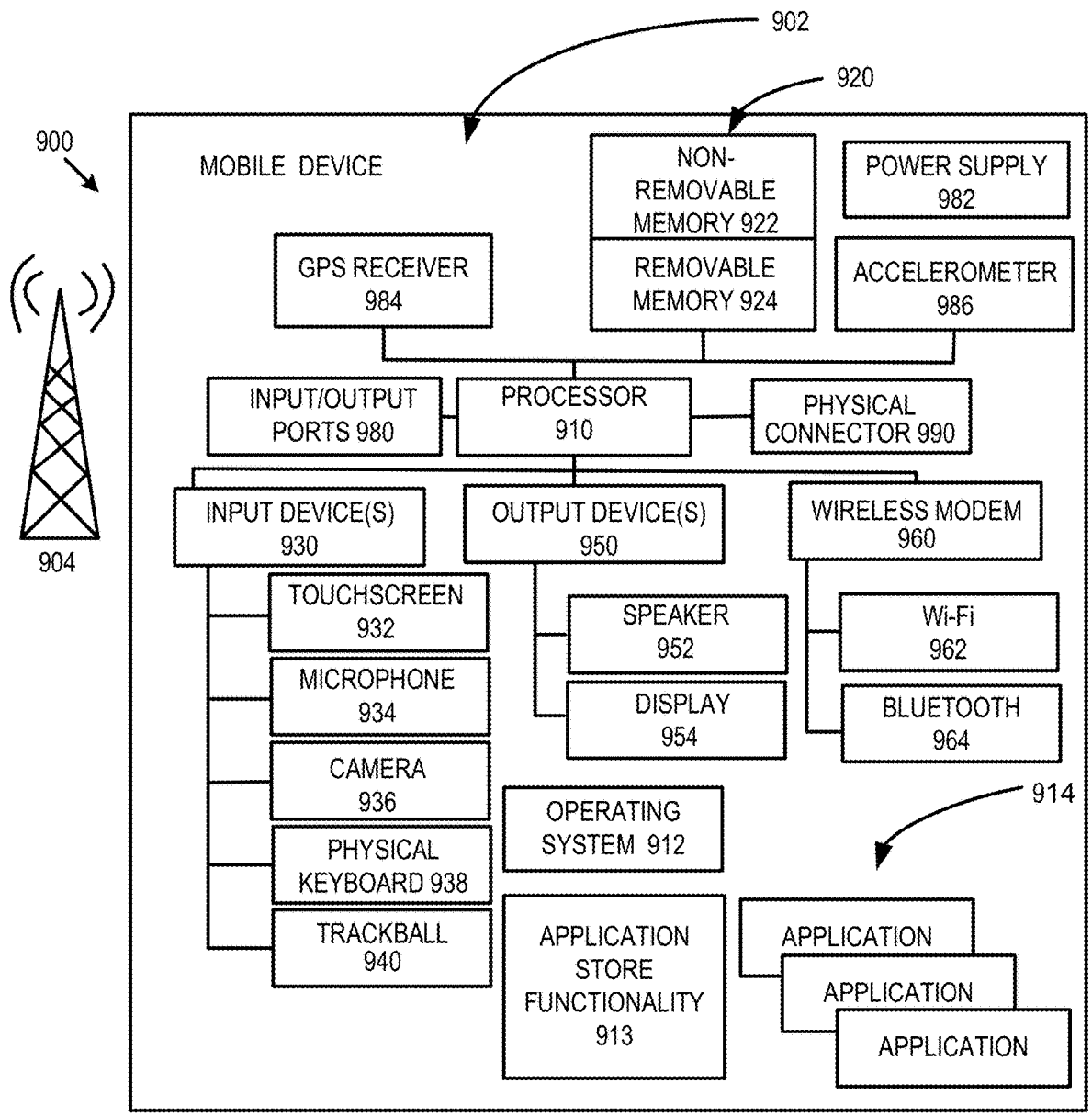
FIG. 9 is an example mobile device that can be used for the technologies described herein.

In any of the examples herein, a communication device can take the form of a mobile device. FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network. Voice over IP scenarios (e.g., over WiFi or other network) can also be supported. The communication devices described herein can take the form of the described mobile device 900.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs 914 can include common mobile computing applications (e.g., email applications, calendars, contact managers, web browsers, messaging applications), or any other computing application. Functionality 913 for accessing an application store can also be used for acquiring and updating applications 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touch screen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM or CDMA network for data and voice communications within a single cellular network, between cellular networks, or between the mobile device and a public switched telephone network (PSTN).

The mobile device 900 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Example 24—Example Cloud-Supported Environment

Figure 10:
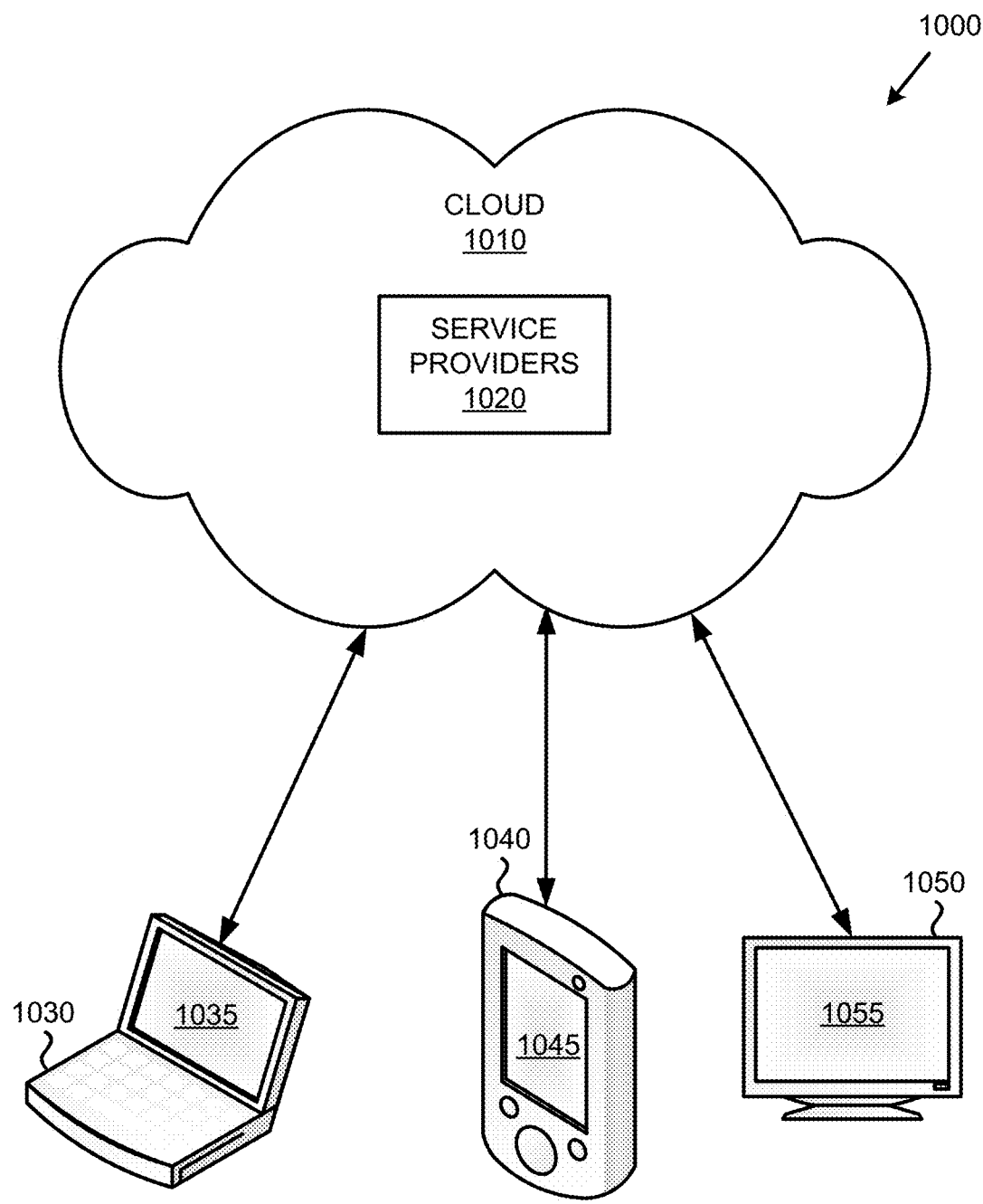
FIG. 10 is an example cloud-support environment that can be used in conjunction with the technologies described herein.

In example environment 1000 of FIG. 10, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touch screen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Example 25—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computing system to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Non-Occluding Alternatives

Although embodiments incorporating occlusion are shown, the technologies can take advantage of the described features in non-occluding scenarios.

Other Embodiments

Clause 1. A method implemented at least in part by a computing device, the method comprising:
in a street-level view of a depicted scene, superimposing a route path over the street-level view; and
depicting the route path as occluded by a physical object in the street-level view.

Clause 2. One or more computer-readable media comprising computer-executable instructions that, when executed, cause a computing system to perform the method of Clause 1.

Clause 3. The method of Clause 1 wherein:
the street-level view is based on a photographic scene bubble of the depicted scene.

Clause 4. The method of any of Clauses 1 or 3 wherein:
the route path comprises a turn; and
depicting the route path as occluded comprises occluding a portion of the route path beyond the turn.

Clause 5. The method of any of Clauses 1, or 3-4 further comprising:
depicting a street name on an un-occluded portion of the route path for a street onto which the route path turns.

Clause 6. The method of any of Clauses 1, or 3-5 wherein:
a plurality of route paths with a plurality of depicted properties are occluded; and
occlusion at least partially preserves the depicted properties.

Clause 7. The method of any of Clauses 1, or 3-6 further comprising:
depicting a visual device other than a route path at a location where the route path turns;
wherein at least a portion of the visual device is depicted as occluded by an object in the depicted scene.

Clause 8. The method of any of Clauses 1, or 3-7 further comprising:
determining that a current location of a device is approaching the depicted scene; and
responsive to determining that the current location of the device is approaching the depicted scene, displaying the street-level view of the depicted scene.

Clause 9. The method of any of Clauses 1, or 3-8 further comprising:
based on a geometry stored in one or more computer-readable media, determining that the physical object is situated between a viewpoint of the street-level view and a street on which the route path is drawn.

Clause 10. The method of Clause 9 wherein:
the stored geometry is associated with the depicted scene.

Clause 11. The method of Clause 10 wherein:
the stored geometry is based on a lidar scan of a geographical location associated with the depicted scene.

Clause 12. The method of any of Clauses 1, or 3-11 wherein:
the street-level view of the depicted scene of part of a route comprising a destination; and
the method further comprises:

depicting a street-level view of the destination of the route, wherein the street-level view comprises a graphical device indication of on which side of a street the destination lies.

Clause 13. The method of any of Clauses 1, or 3-12 wherein:
the route path is portrayed as part of step-by-step route directions; and
the step-by-step route directions comprise a sequential list, wherein the sequential list comprises at least one other street-level view comprising a route path depicted as occluded by a physical object.

Clause 14. The method of any of Clauses 1, or 3-13 wherein:
a degree of occlusion is controlled by a thickness of the physical object.

Clause 15. The method of any of Clauses 1, or 3-14 wherein the physical object comprises:
a building; a guardrail; terrain; a fence; or a vehicle.

Clause 16. The method of any of Clauses 1, or 3-15 wherein:
depicting the route path as occluded comprises removing a portion of the route path from view.

Clause 17. The method of any of Clauses 1, or 3-16 wherein:
depicting the route path as occluded comprises depicting the physical object as partially opaque in front of a portion of the route path.

Clause 18. A system comprising:
in one or more computer-readable media, a stored representation of a digital map comprising information about street-level views, wherein the information comprises photographic scene bubbles associated with the street-level views and geometry associated with the street side views;
a street-level view generator configured to receive a geometry and a photographic bubble associated with a street side view;
wherein the street-level view generator is further configured to receive a viewpoint and output a street-level depiction of a route path as it appears from the viewpoint, wherein at least a portion of the route path is depicted as occluded by an occluding object indicated as being in front of the portion of the route path in the geometry.

Clause 19. The system of Clause 18 wherein:
the viewpoint comprises a current location of a device on which the street-level view is displayed.

Clause 20. One or more computer-readable media comprising computer-executable instructions that, when executed by a computing system, perform a method comprising:
detecting that a mobile device is approaching a turn onto a street at an intersection that is part of a route path between a starting point and a destination;
responsive to detecting that the device is approaching the turn, displaying a photograph-based street-level view of the intersection;
wherein displaying the photograph-based street-level view of the intersection comprises:
displaying a superimposed name of the street on the photograph-based street-level view;
displaying the route path as superimposed on the photograph-based street-level view; and
depicting a portion of the superimposed route path as occluded by an object in the photograph-based street-level view.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:
1. A computer-implemented method comprising:
accessing a digital map, the digital map representing locations and including information about the represented locations, the information further including a scene depiction and geometry associated with the scene depiction;
determining a first location of a viewpoint based on a location input received from a mobile device;
generating a preview depicting a scene from a perspective of the first location of the viewpoint according to the digital map;
determining a route path between a starting point and a destination;
generating a depiction of the route path by:
superimposing the route path over the preview;
determining that an object of varying thickness is situated between the viewpoint and the route path based on the information included in the digital map; and
responsive to determining the object is situated between the viewpoint and the route path, determining a portion of the route path to be occluded by the object; and
displaying the depiction of the route path superimposed over the preview on the mobile device, the displayed route path occluded by the object at the determined portion;
determining that a second location of the mobile device is approaching a predetermined location along the route path;
generating a street-level view depicting a photograph of the predetermined location from a perspective of the second location of the mobile device; and
supplementing the displayed route path superimposed with the preview with the street-level view that depicts the photograph of the predetermined location from the perspective of the second location of the mobile device, the street-level view including the route path occluded by the object at the determined portion, the occlusion varying according to the varying thickness of the object.

2. The computer-implemented method of claim 1, further comprising:
determining a transportation mode of the mobile device; and
providing the route path and the street-level view based on the transportation mode.

3. The computer-implemented method of claim 2, wherein the predetermined location is the destination, the transportation mode comprises a driving mode, and the street-level view comprises a parking entrance.

4. The computer-implemented method of claim 2, wherein the predetermined location is the destination, the transportation mode comprises a walking mode, and the street-level view comprises a building entrance.

5. The computer-implemented method of claim 1, wherein the route path comprises a turn from a first street to a second street and wherein generating the depiction of the route path further comprises:
responsive to determining that the first location of the viewpoint approaches the turn, displaying a street name of the second street with a first depiction of the street name.

6. The computer-implemented method of claim 5, wherein generating the depiction of the route path further comprises:
displaying a second depiction of the street name of the second street that is distinct from the first depiction of the street name.

7. A system comprising:
a processor; and
non-transitory storage memory storing instructions configured to cause the processor to perform:
accessing a digital map, the digital map representing locations and including information about the represented locations, the information further including a scene depiction and geometry associated with the scene depiction;
determining a first location of a viewpoint based on a location input received from a mobile device;
generating a preview depicting a scene from a perspective of the first location of the viewpoint according to the digital map;
determining a route path between a starting point and a destination;
generating a depiction of the route path by:
superimposing the route path over the preview;
determining that an object is situated between the viewpoint and the route path based on the information included in the digital map;
responsive to determining the object is situated between the viewpoint and the route path, determining a portion of the route path to be occluded by the object; and
displaying the depiction of the route path superimposed over the preview on the mobile device, the displayed route path occluded by the object at the determined portion;
determining that a second location of the mobile device is approaching the destination;
selecting a transportation mode of the mobile device from a set of different transportation modes including a driving mode and a walking mode;
generating either a street-level view of a parking entrance of the destination or a street-level view of a front of a building of the destination based on the selection; and
supplementing the displayed route path superimposed with the preview with the generated street-level view.

8. The system of claim 7, wherein responsive to the selected transportation mode being the driving mode, generating the street-level view of the parking entrance of the destination.

9. The system of claim 7, wherein responsive the selected transportation mode being the walking mode, generating the street-level view of the front of the building of the destination.

10. The system of claim 7, wherein the route path comprises a turn from a first street to a second street and wherein generating the depiction of the route path further comprises:
responsive to determining that the first location of the viewpoint approaches the turn, displaying a street name of the second street with a first depiction of the street name.

11. The system of claim 10, wherein generating the depiction of the route path further comprises:
displaying a second depiction of the street name of the second street that is distinct from the first depiction of the street name.

12. A non-transitory computer-readable media storing computer-executable instructions that, when executed by a computing system, cause the computing system to perform:
accessing a digital map, the digital map representing locations and including information about the represented locations, the information further including a scene depiction and geometry associated with the scene depiction;
determining a first location of a viewpoint based on a location input received from a mobile device;
generating a preview depicting a scene from a perspective of the first location of the viewpoint according to the digital map;
determining a route path between a starting point and a destination; and
generating a depiction of the route path by superimposing the route path over the preview;
determining that a second location of the mobile device is approaching a predetermined location along the route path;
determining that an object of varying thickness is situated between a viewpoint of the second location and the route path based on the information included in the digital map;
responsive to determining the object is situated between the viewpoint of the second location and the route path, determining a portion of the route path to be occluded by the object;
generating a street-level view depicting a photograph of the predetermined location from a perspective of the second location of the mobile device; and
supplementing the displayed route path superimposed with the preview with the street-level view that depicts the photograph of the predetermined location from the perspective of the second location of the mobile device, the street-level view including the route path occluded by the object at the determined portion, the occlusion varying according to the varying thickness of the object.

13. The non-transitory computer-readable media of claim 12, wherein the computer-executable instructions are further configured to cause the computing system to perform:
determining a transportation mode of the mobile device; and
providing the route path and the street-level view based on the transportation mode.

14. The non-transitory computer-readable media of claim 13, wherein the predetermined location is the destination, the transportation mode comprises a driving mode, and the street-level view comprises a parking entrance.

15. The non-transitory computer-readable media of claim 13, wherein the predetermined location is the destination, the transportation mode comprises a walking mode, and the street-level view comprises a building entrance.

16. The non-transitory computer-readable media of claim 12, wherein the route path comprises a turn from a first street to a second street and wherein generating the depiction of the route path further comprises:

responsive to determining that the location of the viewpoint approaches the turn, displaying a street name of the second street with a depiction of the second street.

\* \* \* \* \*

UNITED STATES PATENT AND TRADEMARK OFFICE
CERTIFICATE OF CORRECTION

Page 1 of 1

PATENT NO.            : 10,809,091 B2
APPLICATION NO.       : 15/487356
DATED                 : October 20, 2020
INVENTOR(S)           : Otero Diaz et al.

It is certified that error appears in the above-identified patent and that said Letters Patent is hereby corrected as shown below:

In the Claims

In Column 19, Claim 9, Line 61, delete "responsive the" and insert -- responsive to the --, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*